United States Patent
Yoshida et al.

(10) Patent No.: US 10,546,579 B2
(45) Date of Patent: Jan. 28, 2020

(54) VERIFICATION SYSTEM, VERIFICATION METHOD, AND COMPUTER PROGRAM PRODUCT

(71) Applicant: Kabushiki Kaisha Toshiba, Minato-ku, Tokyo (JP)

(72) Inventors: Takami Yoshida, Kawasaki Kanagawa (JP); Kenji Iwata, Machida Tokyo (JP); Hiroshi Fujimura, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/688,591

(22) Filed: Aug. 28, 2017

(65) Prior Publication Data

US 2018/0277106 A1  Sep. 27, 2018

(30) Foreign Application Priority Data

Mar. 22, 2017 (JP) .................... 2017-056403

(51) Int. Cl.
*G10L 15/22* (2006.01)
*G10L 15/18* (2013.01)
(Continued)

(52) U.S. Cl.
CPC ........ *G10L 15/1822* (2013.01); *G06F 16/685* (2019.01); *H04M 3/493* (2013.01); *G10L 2015/223* (2013.01)

(58) Field of Classification Search
CPC ........ G06F 17/30864; G06F 17/30867; G10L 15/22; G10L 15/30; G06Q 30/02; G06Q 10/107

See application file for complete search history.

(56) References Cited

U.S. PATENT DOCUMENTS 6,246,981 B1 *  6/2001  Papineni ................ G10L 15/22
704/235
6,321,198 B1 * 11/2001  Hank .................. H04M 3/4936
704/270

(Continued)

FOREIGN PATENT DOCUMENTS

JP  2001-357053 A  12/2001
JP  2002-543445 A  12/2002

(Continued)

*Primary Examiner* — Jialong He
(74) *Attorney, Agent, or Firm* — Knobbe Martens Olson & Bear, LLP

(57) ABSTRACT

According to an embodiment, a verification system includes a storage controller, first and second receivers, a comparator, a response constructor, a response generator, and an output controller. The storage controller stores, in a storage, first response data and first situation data associated with the first response data. The first receiver receives second response data. The comparator determines a similarity between second situation data indicating a second context for using the second response data and the first situation data. The response constructor constructs response content information comprising the second response data and the first response data associated with the first situation data having the similarity equal to or greater than a threshold. The second receiver receives speech data. The response generator generates a response sentence corresponding to the speech data using the response content information. The output controller outputs for display one or more response sentences.

10 Claims, 14 Drawing Sheets

(51) Int. Cl.
*H04M 3/493* (2006.01)
*G06F 16/683* (2019.01)

(56) References Cited

U.S. PATENT DOCUMENTS

| | | | | |
|---|---|---|---|---|
| 8,589,172 | B2* | 11/2013 | Alonso | G06Q 30/02 379/88.01 |
| 2007/0043570 | A1* | 2/2007 | Scholl | G07F 19/20 704/270.1 |
| 2013/0254216 | A1* | 9/2013 | Yamamoto | G06F 17/30663 707/749 |
| 2014/0279250 | A1* | 9/2014 | Williams | G06Q 30/0625 705/26.62 |
| 2015/0088998 | A1* | 3/2015 | Isensee | H04L 51/02 709/206 |
| 2015/0302057 | A1* | 10/2015 | Kealey | G09B 7/02 707/768 |
| 2016/0092447 | A1* | 3/2016 | Venkataraman | G06F 17/30038 707/765 |
| 2016/0180728 | A1* | 6/2016 | Clark | G06F 17/2785 434/362 |
| 2016/0196265 | A1* | 7/2016 | Allen | G06F 17/3053 707/734 |
| 2016/0342900 | A1* | 11/2016 | Allen | G06F 17/3043 |
| 2017/0032253 | A1* | 2/2017 | Maekawa | G06F 17/30979 |
| 2017/0091846 | A1* | 3/2017 | Henmi | G06F 17/30867 |
| 2017/0098012 | A1* | 4/2017 | Zhu | G06F 17/3053 |
| 2017/0148441 | A1* | 5/2017 | Fujii | G10L 15/10 |
| 2017/0154626 | A1* | 6/2017 | Kim | G10L 15/22 |
| 2017/0161665 | A1* | 6/2017 | Iwata | G06Q 50/10 |
| 2017/0162190 | A1* | 6/2017 | Wakaki | G10L 13/00 |
| 2017/0364519 | A1* | 12/2017 | Beller | G06F 17/3053 |
| 2018/0039990 | A1* | 2/2018 | Lindemann | G06F 21/31 |
| 2018/0060954 | A1* | 3/2018 | Yin | G06F 17/30979 |
| 2018/0075359 | A1* | 3/2018 | Brennan | G06F 17/30958 |
| 2018/0075839 | A1* | 3/2018 | Fume | G06F 3/04842 |
| 2018/0081906 | A1* | 3/2018 | Katz | G06F 17/30654 |
| 2018/0082187 | A1* | 3/2018 | Katz | G06F 17/30684 |
| 2018/0137419 | A1* | 5/2018 | Byron | G06N 5/02 |
| 2018/0137420 | A1* | 5/2018 | Byron | G06N 5/02 |
| 2018/0157641 | A1* | 6/2018 | Byron | G06F 17/2785 |
| 2018/0184168 | A1* | 6/2018 | Matthews | G06Q 30/02 |
| 2018/0204106 | A1* | 7/2018 | Beller | G06N 3/006 |

FOREIGN PATENT DOCUMENTS

| | | |
|---|---|---|
| JP | 2007-530327 A | 11/2007 |
| JP | 2013-105436 A | 5/2013 |

\* cited by examiner

|  | SAME BUILDING | DIFFERENT BUILDINGS |
|---|---|---|
| FLOORS SEPARATED BY TWO FLOORS | 0.6 | 0.1 |
| FLOORS SEPARATED BY ONE FLOOR | 0.8 | 0.3 |
| SAME FLOOR | 1.0 | 0.5 |

|  | LOWER LIMIT | UPPER LIMIT |
| --- | --- | --- |
| INFANT | 0 YEARS OLD | 4 YEARS OLD |
| CHILD | 5 YEARS OLD | 12 YEARS OLD |
| ADOLESCENT | 15 YEARS OLD | 24 YEARS OLD |
| ADULT | 20 YEARS OLD | 100 YEARS OLD |
| ⋮ | ⋮ | ⋮ |
| SENIOR | 60 YEARS OLD | 70 YEARS OLD |
| ALL AGES | 0 YEARS OLD | 100 YEARS OLD |

FIG.5

| SHOP NAME | ITEMS AVAILABLE | PRICE RANGE | ... |
|---|---|---|---|
| SHOE SHOP A | LEATHER SHOES, SNEAKERS | HIGH QUALITY | ... |
| CAFÉ A | COFFEE | NORMAL | ... |
| CLOTHING SHOP A | WOMEN'S CLOTHING | HIGH QUALITY | ... |
| ⋮ | ⋮ | ⋮ | ⋮ |

VERIFICATION SYSTEM, VERIFICATION METHOD, AND COMPUTER PROGRAM PRODUCT

CROSS-REFERENCE TO RELATED APPLICATIONS

This application is based upon and claims the benefit of priority from Japanese Patent Application No. 2017-056403, filed on Mar. 22, 2017; the entire contents of which are incorporated herein by reference.

FIELD

Embodiments described herein relate generally to a verification system, a verification method, and a computer program.

BACKGROUND

A dialogue system has been known which generates, using a dialogue engine, a response to the user's speech that is input by, for example, a voice or text and outputs the response as a voice or text. In recent years, with the spread of a dialogue system, customized dialogue engines, such as a dialogue engine that is specialized in a specific task and a dialogue engine that generates an individual response, have been constructed.

BRIEF DESCRIPTION OF THE DRAWINGS

FIG. 5 is a diagram illustrating an example of a response content DB in the first embodiment;

DETAILED DESCRIPTION

According to an embodiment, a verification system includes a storage controller, a first receiver, a comparator, a response constructor, a second receiver, a response generator, and an output controller. The storage controller stores, in a storage device, first response data and first situation data associated with the first response data. The first response data used to generate one or more response sentences, and the first situation data indicates a first context for using the first response data. The first receiver receives second response data used to generate the one or more response sentences. The comparator determines a first similarity between second situation data indicating a second context for using the second response data and the first situation data. The response constructor constructs response content information comprising the second response data and the first response data associated with the first situation data when the first similarity is equal to or greater than a first threshold value. The second receiver receives speech data corresponding to a user's speech. The response generator generates a response sentence corresponding to the speech data using the response content information. The output controller outputs for display the one or more response sentences.

Hereinafter, embodiments of a verification system, a verification method, and a program will be described in detail with reference to the accompanying drawings.

First Embodiment

Figure 1:
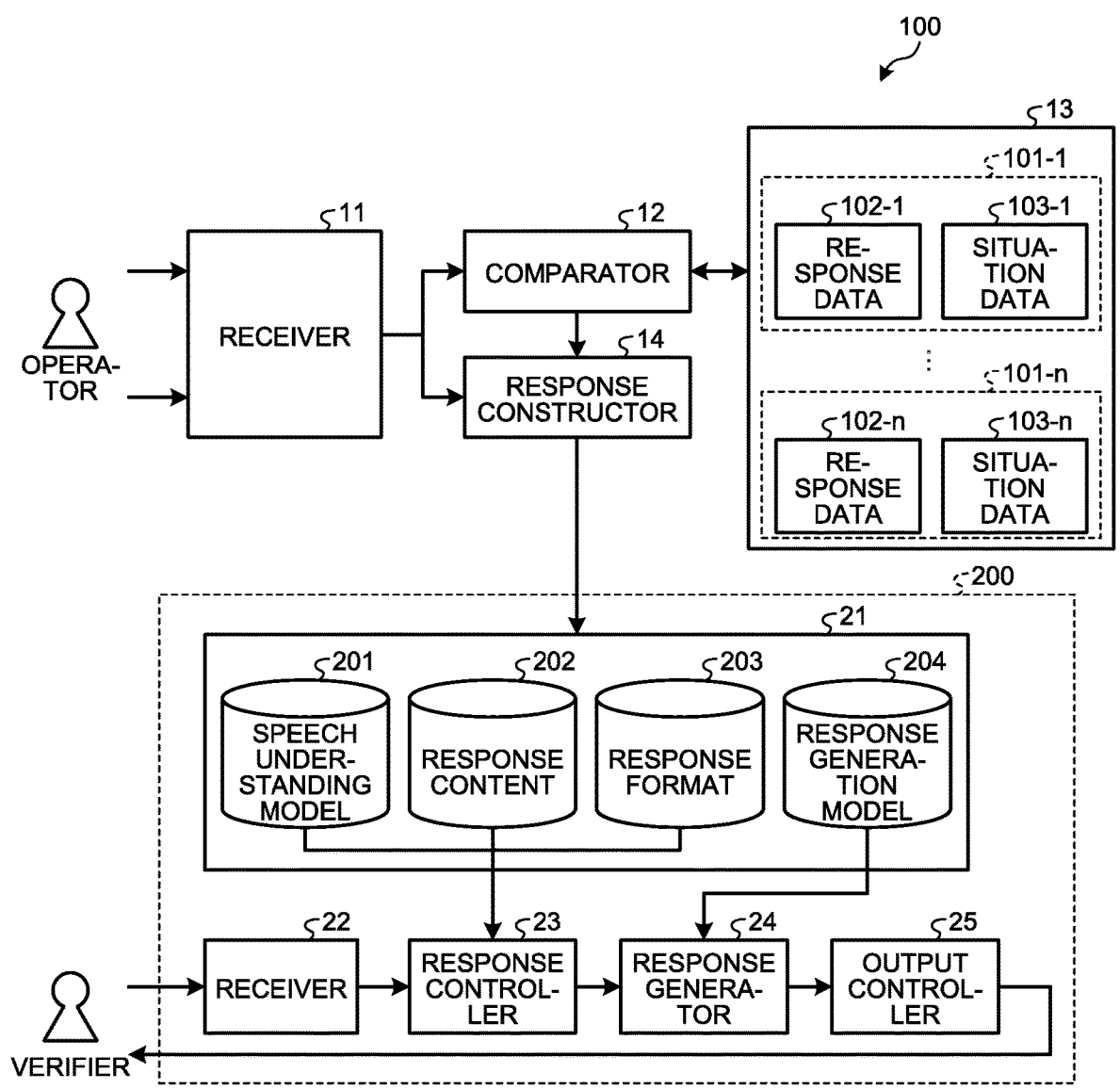
FIG. 1 is a diagram illustrating an example of the functional structure of a verification system according to a first embodiment.

First, a first embodiment will be described.
Example of Functional Structure
FIG. 1 is a diagram illustrating an example of the functional structure of a verification system 100 according to the first embodiment. The verification system 100 according to the first embodiment includes a receiver 11, a comparator 12, a storage device 13, a response constructor 14, and a dialogue system 200.

The receiver 11 receives response data (second response data) and situation data (second situation data) from an operator.

The response data is used to generate one or more response sentences. The response data is, for example, item sale information. The sale information includes, for example, a period, a shop name, and content. The period is, for example, "April 29th to May 5th". The shop name is, for example, an "electric appliance store D". The content is, for example, "DOLL 30% OFF".

When the response data is item sale information, for example, a response sentence "An electric appliance store D was searched for as a shop carrying dolls" is generated.

The situation data indicates a context for using the response data. The situation data includes, for example, at least one of information indicating a period, information indicating a place, information indicating age, information indicating sex, information indicating a price, information indicating a type, and information indicating taste. The situation data may have any data format. The situation data is, for example, parameters indicating the situation in which the response data is used.

The period is, for example, "April 29th to May 5th". The information indicating a place is, for example, "a toy area on the third floor". The information indicating age is, for example, "3 to 12 years old". The information indicating sex is, for example, "female". The information indicating a price is, for example, "3000 yen or less". The information indicating a type is, for example, "formal" and "casual" indicating the type of suit. The information indicating taste is, for example, "Western food", "Japanese food", and "Chinese food" indicating favorite food.

The information included in the response data and the information included in the situation data may partially overlap each other. For example, the information indicating a period and the information indicating a price may be included in both the response data and the situation data.

When receiving the response data and the situation data, the receiver 11 inputs the response data to the response constructor 14 and inputs the situation data to the comparator 12.

When receiving the situation data from the receiver 11, the comparator 12 determines similarity between the received situation data and situation data 103-$k$ included in a data set 101-$k$ (1≤k≤n, n and k are integers equal to or greater than 1) that is stored in the storage device 13.

The storage device 13 (storage controller) stores data sets 101-1 to 101-$n$. Since the data sets 101-1 to 101-$n$ have the same structure, the data set 101-1 will be described as a representative example.

The data set 101-1 includes response data 102-1 and situation data 103-1. Since the response data 102-1 is the same as the response data received by the receiver 11, the description thereof will not be repeated. Similarly, since the situation data 103-1 is the same as the situation data received by the receiver 11, the description thereof will not be repeated.

Hereinafter, when the data sets 101-1 to 101-$n$ are not distinguished from each other, they are simply referred to as data sets 101. Similarly, when the response data pieces 102-1 to 102-$n$ are not distinguished from each other, they are simply referred to as response data 102. Similarly, when the situation data pieces 103-1 to 103-$n$ are not distinguished from each other, they are simply referred to as situation data 103.

Example of Determination of Similarity Between Situation Data Pieces

In some cases, the situation data received by the receiver 11 and the situation data 103 stored in the storage device 13 have numerical values or labels. When the situation data 103 has numerical values, it includes information indicating a period (for example, May 1st to May 8th), information indicating age (for example, 6 to 12 years old), and information indicating a price (for example, 10,000 yen or less). When the situation data 103 has labels, it includes information indicating a place (for example, the first floor of the main building), information indicating sex (for example, male), and information indicating a type (for example, formal).

In the following description, the situation data received by the receiver 11 is referred to as operation verification situation data. In addition, the response data received by the receiver 11 is referred to as operation verification response data.

When the operation verification situation data has numerical values, the comparator 12 determines similarity based on, for example, the size of an overlap range between the range indicated by the operation verification situation data and the range indicated by the situation data 103 stored in the storage device 13.

When the operation verification situation data has labels, the comparator 12 determines the similarity based on, for example, whether the labels are identical to each other. In addition, for example, when the operation verification situation data has labels, the comparator 12 determines the similarity based on definition information that defines similarity.

The comparator 12 may compare the labels with the numerical values, using conversion information such as a conversion table for converting a label into a numerical value.

Next, similarity determination examples will be described with reference to a detailed example.

In Case of Information Indicating Period

Figure 2:
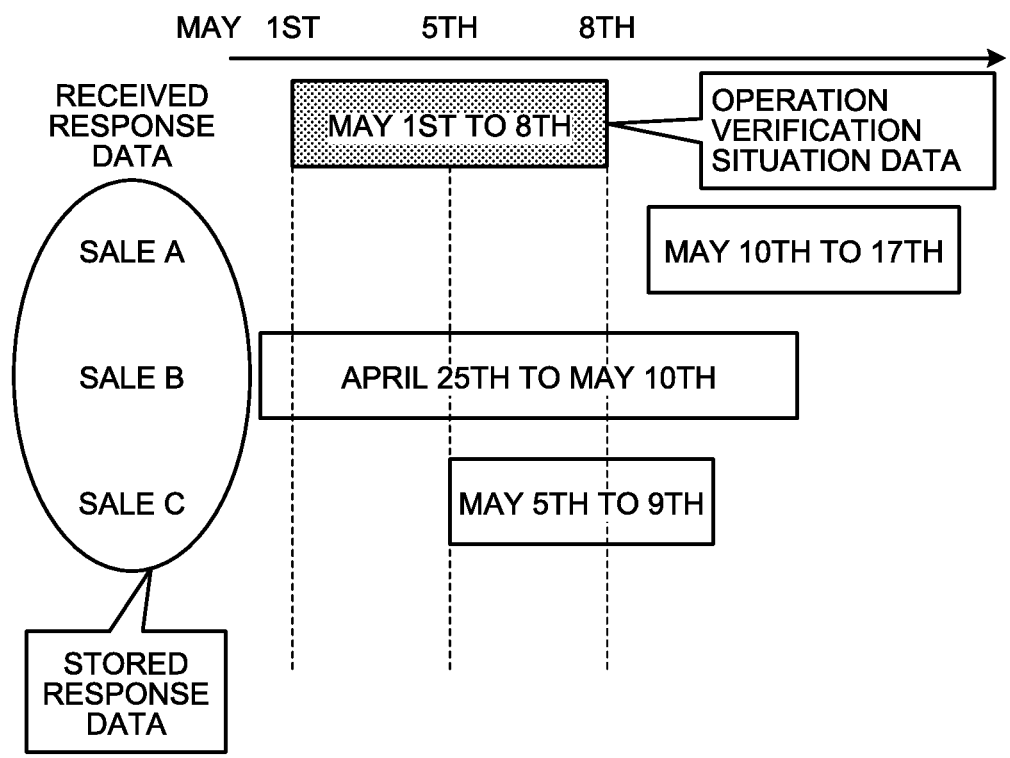
FIG. 2 is a diagram illustrating Similarity Determination Example 1 in the first embodiment.

FIG. 2 is a diagram illustrating Similarity Determination Example 1 in the first embodiment. For example, when the operation verification response data indicates a sale for a specific period, the operation verification situation data includes the starting date and the end date of the sale. In the example illustrated in FIG. 2, the operation verification response data is new sale information. In addition, the operation verification situation data indicates a period of May 1st to May 8th in the new sale information.

For example, when the period indicated by the starting date and the end date included in the operation verification situation data is included in the period indicated by the situation data 103 stored in the storage device 13, the comparator 12 determines that the similarity is 1. In the example illustrated in FIG. 2, the period indicated by the operation verification situation data is included in the period indicated by the situation data 103 that is associated with the response data 102 indicating a "sale B". Therefore, the comparator 12 determines that the similarity between the operation verification situation data and the situation data 103 associated with the response data 102 indicating the "sale B" is 1.

For example, when the period indicated by the starting date and the end date included in the operation verification situation data is not included in the period indicated by the situation data 103 stored in the storage device 13, the comparator 12 determines that the similarity is 0. In the example illustrated in FIG. 2, the period indicated by the operation verification situation data is not included in the period indicated by the situation data 103 that is associated with the response data 102 indicating the "sale A". Therefore, the comparator 12 determines that the similarity between the operation verification situation data and the situation data 103 associated with the response data 102 indicating the "sale A" is 0.

For example, when the period indicated by the starting date and the end date included in the operation verification situation data overlaps the period indicated by the situation data 103 stored in the storage device 13, the comparator 12 determines the similarity based on the duration of the overlap period. For example, when the duration of the overlap period is 20% of the duration of the period indicated by the situation data 103 stored in the storage device 13, the comparator 12 determines that the similarity is 0.2. In the example illustrated in FIG. 2, the period indicated by the operation verification situation data partially overlaps the period indicated by the situation data 103 that is associated with the response data 102 indicating a "sale C". Therefore, the comparator 12 determines that the similarity between the operation verification situation data and the situation data 103 associated with the response data 102 indicating the "sale C" is, for example, 0.6.

In Case of Information Indicating Place

Figures 3A, 3B:
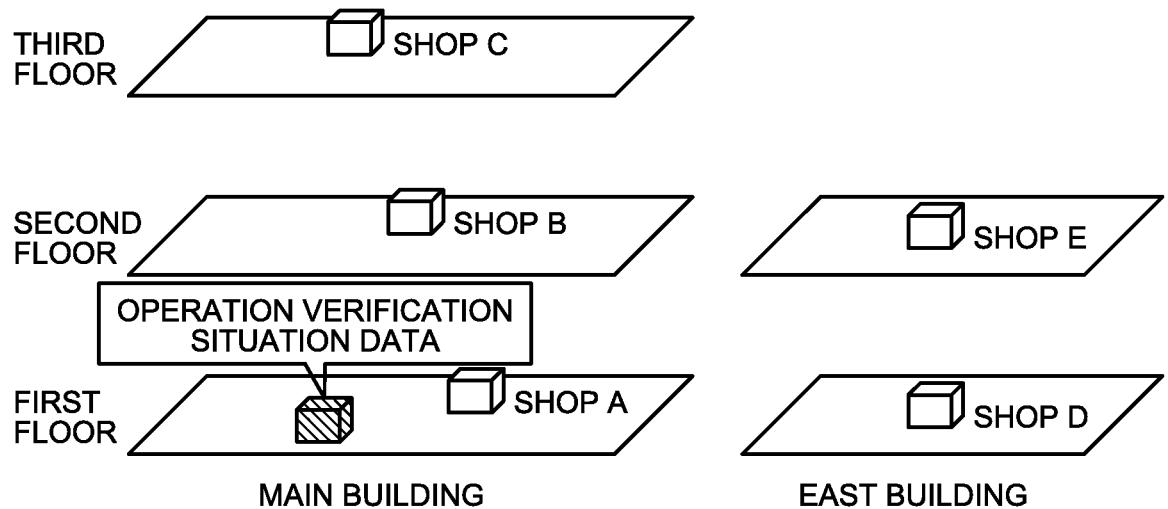
FIG. 3A is a diagram illustrating Similarity Determination Example 2 in the first embodiment.
FIG. 3B is a diagram illustrating an example of definition information used in Similarity Determination Example 2.

FIG. 3A is a diagram illustrating Similarity Determination Example 2 in the first embodiment. For example, when the operation verification response data indicates a sale in a shop, the operation verification situation data includes information indicating a place. The information indicating a place indicates, for example, the place where the dialogue system is installed and the position of the shop. FIG. 3A illustrates an example in which the comparator 12 determines the similarity between the operation verification situation data pieces indicating the places in a shopping center including a 3-story main building and a 2-story East building.

FIG. 3B is a diagram illustrating an example of definition information used in Similarity Determination Example 2. The definition information defines similarity. The similarity may be defined by any method. For example, the similarity may be defined in inverse proportion to the physical travel distance of the user. In addition, for example, the similarity may be defined in inverse proportion to a travel time considering means of transportation. The means of transportation are, for example, walk, an escalator, and an elevator.

The place indicated by the operation verification situation data and a place indicated by the situation data 103 that indicates the position of a shop A are on the same floor of the same building. The comparator 12 determines, using the definition information illustrated in FIG. 3B, that the similarity between the place indicated by the operation verification situation data and the place indicated by the situation data 103 that indicates the position of the shop A is 1.

The place indicated by the operation verification situation data and a place indicated by the situation data 103 that indicates the position of a shop B are in the same building and are on different floors which are separated by one floor. The comparator 12 determines, using of the definition information illustrated in FIG. 3B, that the similarity between the place indicated by the operation verification situation data and the place indicated by the situation data 103 that indicates the position of the shop B is 0.8.

The place indicated by the operation verification situation data and a place indicated by the situation data 103 that indicates the position of a shop C are in the same building and are on different floors which are separated by two floors. The comparator 12 determines, using the definition information illustrated in FIG. 3B, that the similarity between the place indicated by the operation verification situation data and the place indicated by the situation data 103 that indicates the position of the shop C is 0.6.

The place indicated by the operation verification situation data and a place indicated by the situation data 103 that indicates the position of a shop D are in different buildings and are on the same floor (story). The comparator 12 determines, using the definition information illustrated in FIG. 3B, that the similarity between the place indicated by the operation verification situation data and the place indicated by the situation data 103 that indicates the position of the shop D is 0.5.

The place indicated by the operation verification situation data and a place indicated by the situation data 103 that indicates the position of a shop E are on different floors (stories) which are separated by one floor in different buildings. The comparator 12 determines, using the definition information illustrated in FIG. 3B, that the similarity between the place indicated by the operation verification situation data and the place indicated by the situation data 103 that indicates the position of the shop E is 0.3.

In Case of Information Indicating Target

Figures 4A, 4B:
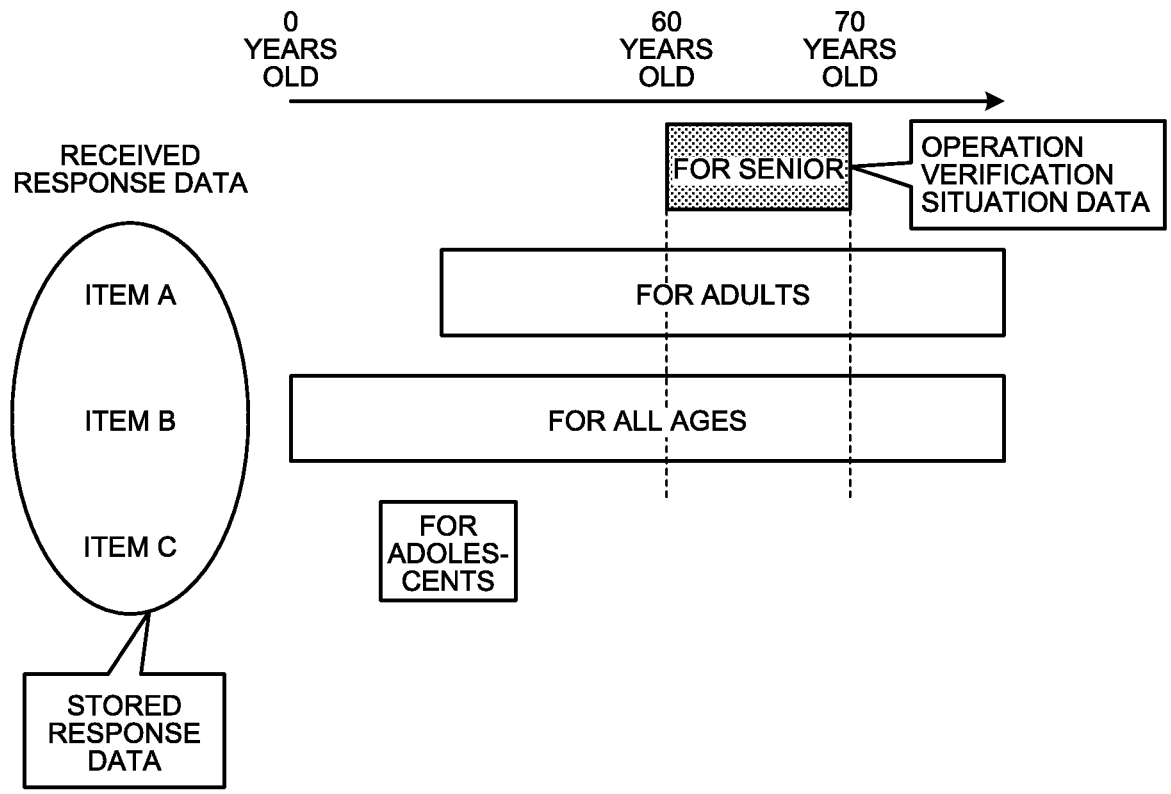
FIG. 4A is a diagram illustrating Similarity Determination Example 3 in the first embodiment.
FIG. 4B is a diagram illustrating an example of conversion information used in Similarity Determination Example 3.

FIG. 4A is a diagram illustrating Similarity Determination Example 3 in the first embodiment. For example, when the operation verification response data indicates an item sale, the operation verification situation data includes, for example, information indicating a target (a combination of sex and age).

Sex includes male, female, and unisex (both sexes). Similarity is defined as follows. For example, in the case of the comparison between "male and male", between "female and female", between "unisex and unisex", between "unisex and male", and between "unisex and female", similarity is 1. In the case of the comparison between "male and female", similarity is 0.

For example, age is grouped into "all ages" and "senior". When the age groups are the same, similarity is 1. When the age groups are different from each other, similarity is 0. In addition, the comparator 12 may determine age similarity from labels indicating, for example, "all ages" and "senior" based on conversion information such as a conversion table.

FIG. 4B is a diagram illustrating an example of conversion information used in Similarity Determination Example 3. In the example of the conversion information illustrated in FIG. 4B, for example, the label indicating "all ages" is converted into a numerical (age) range from 0 to 100 years old and the label indicating "senior" is converted into a numerical (age) range from 60 to 70 years old. The comparator 12 can convert a label into a numeral range, using the conversion information, and can determine the similarity between the labels using the inclusion relationship between the numerical ranges.

For simplicity, a case in which the similarity between targets is determined, without considering sex, will be described with reference to FIG. 4A. In the example illustrated in FIG. 4A, the operation verification situation data indicates "for senior".

"For senior" indicated by the operation verification situation data is converted into a numeral range from 60 years old or older to 70 years old or younger based on the conversion information illustrated in FIG. 4B. "For adults" indicated by the situation data 103 that is associated with the response data 102 indicating an "item A" is converted into a range from 20 years old or older to 100 years old or younger based on the conversion information illustrated in FIG. 4B. "For all ages" indicated by the situation data 103 that is associated with the response data 102 indicating an "item B" is converted into a range from 0 years old or older to 100 years old or younger based on the conversion information illustrated in FIG. 4B. "For adolescents" indicated by the situation data 103 that is associated with the response data 102 indicating an "item C" is converted into a range from 15 years old or older to 24 years old or younger based on the conversion information illustrated in FIG. 4B.

In the age range, "for senior" indicated by the operation verification situation data is included in "for adults" indicated by the situation data 103 that is associated with the response data 102 indicating the "item A". Therefore, the comparator 12 determines that the similarity between "for senior" indicated by the operation verification situation data and "for adults" indicated by the situation data 103 that is associated with the response data 102 indicating the "item A" is 1.

In the age range, "for senior" indicated by the operation verification situation data is included in "for all ages" indicated by the situation data 103 that is associated with the response data 102 indicating the "item B". Therefore, the comparator 12 determines that the similarity between "for senior" indicated by the operation verification situation data and "for all ages" indicated by the situation data 103 that is associated with the response data 102 indicating the "item B" is 1.

In the age range, "for senior" indicated by the operation verification situation data is not included in "for adolescents" indicated by the situation data 103 that is associated with the response data 102 indicating the "item C". Therefore, the comparator 12 determines that the similarity between "for senior" indicated by the operation verification situation data and "for adolescents" indicated by the situation data 103 that is associated with the response data 102 indicating the "item C" is 0.

In Case of Information Indicating Price

For example, when operation verification response data indicates an item sale, the operation verification situation data includes a label indicating a price range. Information indicating a price includes, for example, a low price range, a high price range, and a low/high price range. The low/high price range includes both a low-price item and a high-price item. Similarity is defined as follows. For example, in the case of the comparison between "the high price range and the high price range", between "the low price range and the low price range", between "the low/high price range and the low/high price range", between "the high price range and the low/high price range", and between "the low price range and the low/high price range", similarity is 1. In the case of the comparison between "the high price range and the low price range", similarity is 0. Similarly to the label indicating age, the similarity between the labels indicating the price ranges may be converted into a numeral range and then determined, using the conversion information (see FIG. 4B). For example, the conversion information is used to convert the "low price range" into "3,000 yen or less" and to convert the "high price range" into "more than 3,000 yen".

In Case of Information Indicating Type

For example, when the operation verification response data indicates a suit sale, the operation verification situation data includes a label indicating a type. The information indicating a type includes, for example, a formal suit, a casual suit, and a formal/casual suit. The formal/casual suit indicates both a formal suit and a casual suit. Similarity is defined as follows. For example, in the case of the comparison between "the formal suit and the formal suit", between "the casual suit and the casual suit", between "the formal/casual suit and the formal/casual suit", between "the formal suit and the formal/casual suit", and between "the casual suit and the formal/casual suit", similarity is 1. In the case of the comparison between "the formal suit and the casual suit", similarity is 0.

Returning to FIG. 1, the comparator 12 reads the response data 102 associated with the situation data 103 in which the similarity is equal to or greater than a threshold value (first threshold value) from the storage device 13 and inputs the response data 102 to the response constructor 14. The threshold value may be arbitrarily determined. For example, the threshold value may be appropriately set by an operator. For example, the comparator 12 may calculate the similarity between all or some of n situation data pieces 103 stored in the storage device 13 and the operation verification situation data and may set the threshold value based on statistics such as the mean and median of the similarity.

The response constructor 14 receives the operation verification response data from the receiver 11 and receives the response data 102 associated with the situation data 103 in which the similarity is equal to or greater than the threshold value from the comparator 12. The response constructor 14 constructs a response content database (DB) 202 (response content information) including the operation verification response data and the response data 102 associated with the situation data 103 in which the similarity is equal to or greater than the threshold value. Then, the response constructor 14 stores the response content DB 202 in a storage device 21 of the dialogue system 200.

Next, the dialogue system 200 will be described.

The dialogue system 200 includes a storage device 21, a receiver 22, a response controller 23, a response generator 24, and an output controller 25.

The storage device 21, the response controller 23, and the response generator 24 correspond to a dialogue engine. The processing of the dialogue engine include a speech understanding for understanding speech data received from the user, a dialogue control for determining a response format (response scenario), and a response generation for generating a detailed response sentence according to the response format. Such processing is customized to thereby achieve, for example, speech understanding that is specialized in a specific task, dialogue control that can present information of a new response content DB 202, and response generation that generates a response sentence having an individual speech style.

When the dialogue system 200 is customized, it is necessary to verify in advance whether the processing affected by the customization is correctly performed. For example, it is necessary to verify in advance whether the customized dialogue system 200 can correctly understand speech data received from the user. In addition, for example, it is necessary to verify in advance whether the customized dialogue system 200 provides a dialogue stream as intended. Further, for example, it is necessary to verify in advance whether the information of the response content DB 202 stored in the customized dialogue system 200 is appropriately presented. Furthermore, for example, it is necessary to verify in advance whether the customized dialogue system 200 generates the response sentence without any error as a sentence.

In the verification of the operation of the dialogue engine, it is important to verify the operation according to the situation in which the dialogue engine is actually used. For example, when the dialogue system 200 is used to guide stores in a shopping center, it is important to adapt the behavior of the dialogue engine to the place where the dialogue system 200 is used, the time when the dialogue system 200 is used, the sex and age of the user who uses the dialogue system 200, items carried by a shop, and the sale information of the shop.

For example, sale information starting after a month is additionally registered as the operation verification response data in the response content DB 202. When the operation of the dialogue engine is verified, sale information of other shops for the same period is also stored in the response content DB 202. In this case, it is possible to suit the situation in which the dialogue engine is used.

The storage device 21 stores a speech understanding model 201, the response content DB 202, a response format DB 203, and a response generation model 204.

The speech understanding model 201 (speech understanding information) includes information that enables the dialogue system 200 to understand a speech. For example, the speech understanding model 201 is used to generate speech intention information indicating the intention of a speech. For example, in the speech understanding model 201, the feature amount of a word and the speech intention information are stored in an associated manner with each other. The feature amount is, for example, a vector indicating the features of a word.

Specifically, in the speech understanding model 201, for example, a feature amount indicating "want" and the user's action "shop search" are stored in an associated manner with each other. In addition, for example, in the speech understanding model 201, a feature amount "where" and the user's action "place search" are stored in an associated manner with each other. Further, for example, in the speech understanding model 201, a feature amount indicating "shoes" and a target "shoes" are stored in an associated manner with each other. Furthermore, for example, in the speech understanding model 201, a feature amount indicating "toilet" and a target "toilet" are stored in an associated manner with each other.

The response controller 23 specifies speech intention information from words included in the speech data, using the speech understanding model 201, to estimate the intention of the user's speech. For example, when the speech includes "want", the response controller 23 can estimate that the intention of the user's speech is "shop search".

The response content DB 202 is constructed by the response content constructor 14. The response content DB 202 includes the operation verification response data. In addition, the response content DB 202 includes the response data 102 associated with the situation data 103 of which the similarity to the operation verification situation data is equal to or greater than the threshold value among the response data pieces 102 stored in the storage device 13.

When the operation verification response data and the response data 102 indicate shop information, the data stored in the response content DB 202 includes, for example, a shop name, items that are carried by the shop, a price range.

FIG. 5 is a diagram illustrating an example of the response content DB 202 according to the first embodiment. In the example illustrated in FIG. 5, items that are carried by a shop with a name "shoe shop A" are "leather shoes" and "sneakers" and the price range is "high quality".

Returning to FIG. 1, the response format DB 203 (response format information) stores information for determining a response format (response scenario) indicating the format of a response sentence corresponding to the speech intention information.

The response format DB 203 stores, for example, a combination of an action "unknown" and a target "unknown" and a question format (request (X=action, Y=target)) in an associated manner with each other. In addition, for example, the response format DB 203 stores a combination of an action "shop search" and a target "shoes" and a proposal format (offer (X=target, Y=shop)) in an associated manner with each other. Further, for example, the response format DB 203 stores an action "place search" and a target "unknown" and a question format (request (X=target)) in an associated manner with each other.

The response generation model 204 (response generation information) stores information for generating a response sentence. The response generation model 204 stores, for example, a response format and a response sentence in an associated manner with each other. Specifically, the response generation model 204 stores, for example, a question format (request (X=target)) and a response sentence "What do you want for X" in an associated manner with each other. In addition, for example, the response generation model 204 stores a confirmation format (confirm (X=x)) and a response sentence "Is it all right that X is x?" in an associated manner with each other. Furthermore, for example, the response generation model 204 stores a proposal format (offer (X=target, Y=shop)) and a response sentence "Y was searched for as a shop carrying X" in an associated manner with each other.

The receiver 22 receives speech data from a verifier (user). The speech data indicates the verifier's speech. The speech data may have any format. The speech data is, for example, text data. Alternatively, for example, the speech data is audio data. When the speech data is audio data, the receiver 22 performs speech recognition for the audio data to acquire a speech recognition result such as text data indicating a speech.

The dialogue system 200 repeats a process of outputting a response sentence corresponding to the speech data received from the verifier and receiving speech data corresponding to the response sentence to dialogue with the verifier.

In the first embodiment, an example in which the verifier and the operator are different from each other has been described. However, the verifier and the operator may be the same.

When receiving the speech data from the receiver 22, the response controller 23 performs a response control corresponding to the speech data to determine a response format. An example of the response control will be described below with reference to FIG. 6. The response controller 23 inputs the response format to the response generator 24.

When receiving the response format from the response controller 23, the response generator 24 generates a response sentence from the response format, using the response generation model 204. An example of the response sentence generation will be described below with reference to FIG. 6. The response generator 24 inputs the response sentence to the output controller 25.

When receiving the response sentence from the response generator 24, the output controller 25 outputs the response sentence. The response sentence may be output in any form. The output controller 25 outputs, for example, an utterance of the response sentence. Alternatively, for example, the output controller 25 outputs display information including text indicating the response sentence. Still alternatively, for example, the output controller 25 may output both the response sentence speech and the display information including text indicating the response sentence.

Next, an example of the operation of the dialogue system 200 will be described.

Example of Operation of Dialogue System

Figure 6:
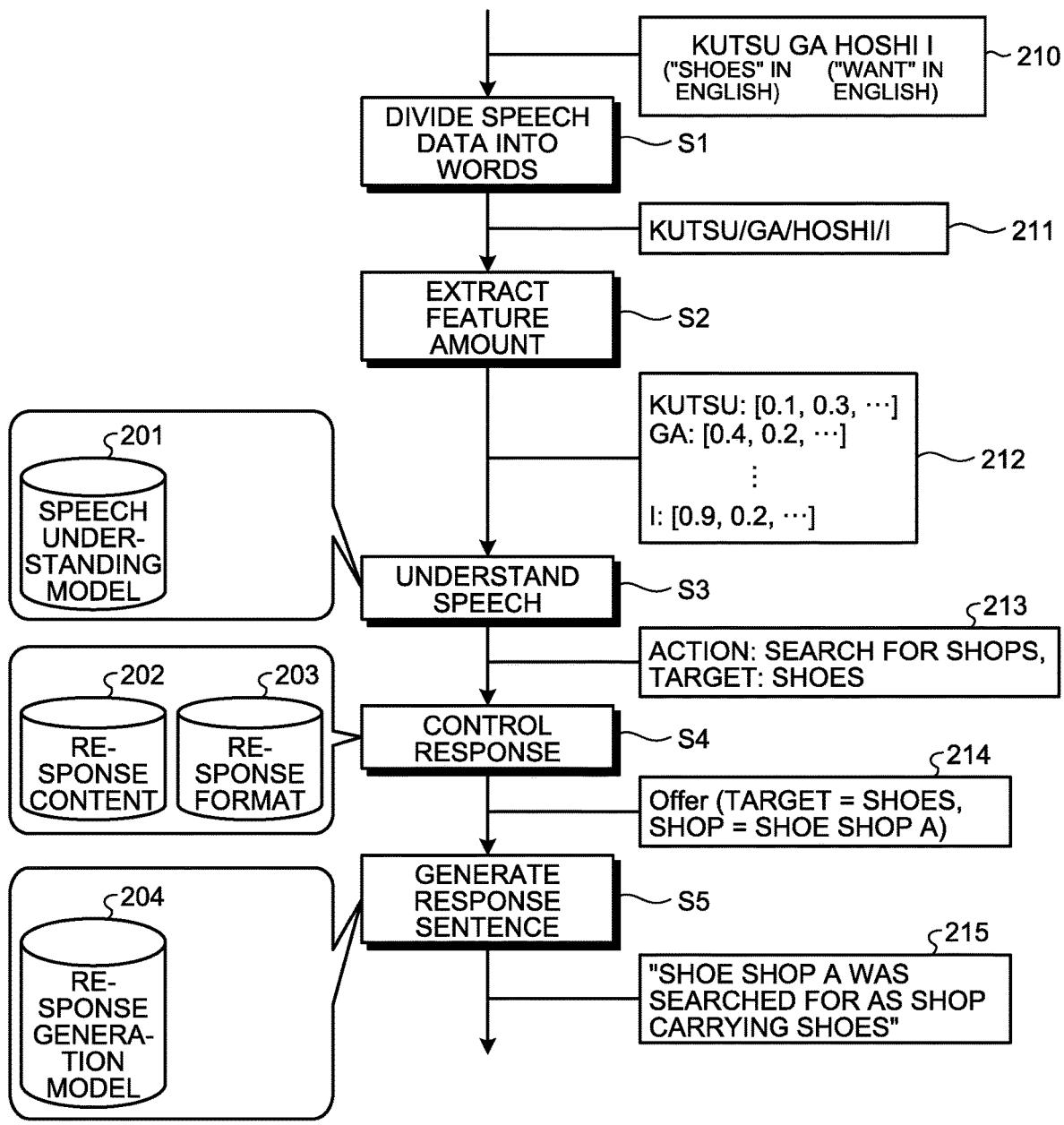
FIG. 6 is a diagram illustrating an example of the operation of a dialogue system according to the first embodiment.

FIG. 6 is a diagram illustrating an example of the operation of the dialogue system 200 according to the first embodiment. First, when receiving speech data 210 indicating the verifier's speech from the receiver 22, the response controller 23 divides the speech data 210 into words to generate divided data 211 (Step S1). Then, the response controller 23 extracts a feature amount 212 of each word included in the divided data 211 (Step S2).

Then, the response controller 23 understands the speech, using the speech understanding model 201 (Step S3). Specifically, the response controller 23 generates speech intention information 213 from the feature amount 212, using the speech understanding model 201.

Then, the response controller 23 controls a response, using the response content DB 202 and the response format DB 203 (Step S4). Specifically, the response controller 23 determines a response format 214 from the feature amount 212 and the speech intention information 213, using the response content DB 202 and the response format DB 203.

Then, the response controller 23 generates a response sentence 215 from the response format 214, using the response generation model 204 (Step S5). The response sentence 215 generated at Step S5 is output by the output controller 25.

Next, a verification method according to the first embodiment will be described.

Verification Method

Figure 7:
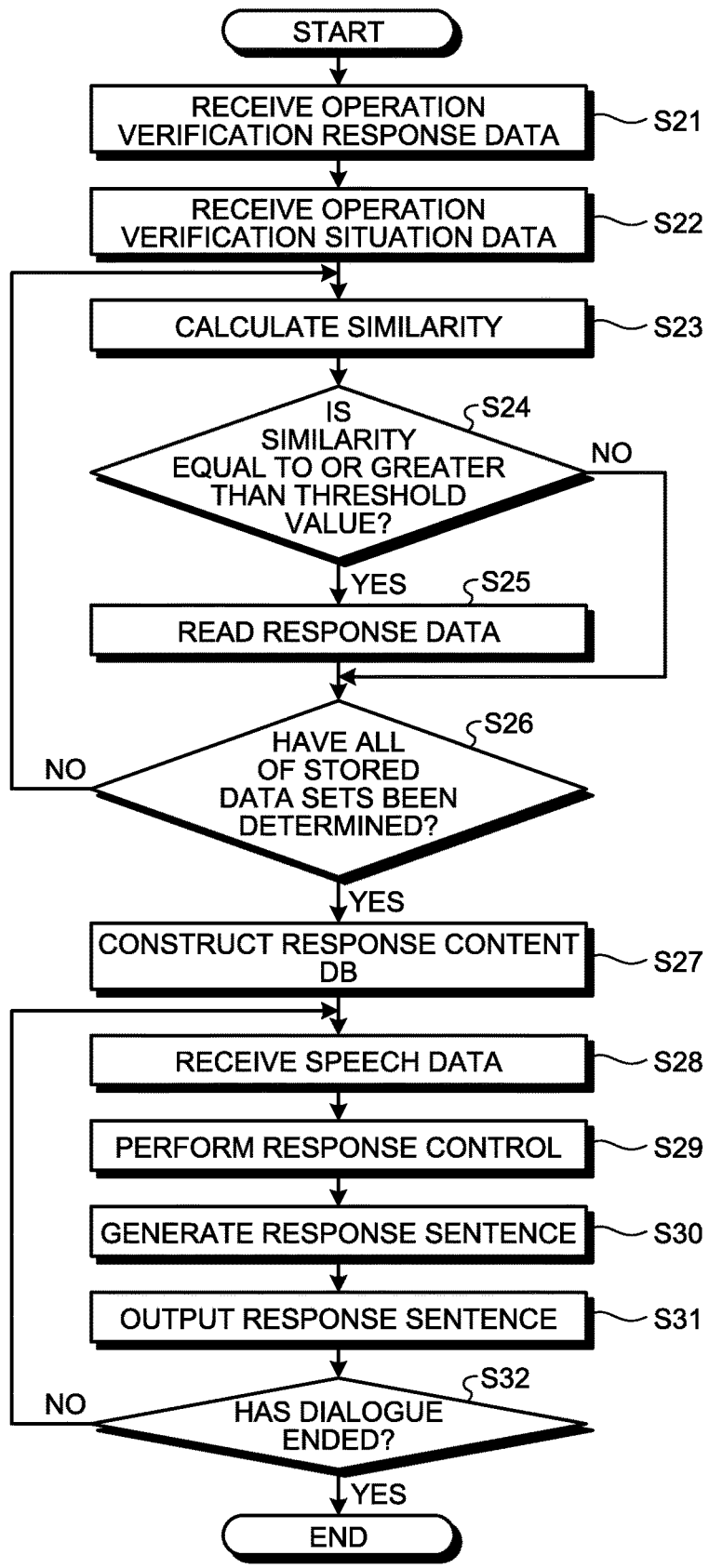
FIG. 7 is a flowchart illustrating an example of a verification method according to the first embodiment.

FIG. 7 is a flowchart illustrating an example of the verification method according to the first embodiment. First, the receiver 11 receives the operation verification response data from the operator (Step S21). Then, the receiver 11 receives the operation verification situation data from the operator (Step S22).

Then, the comparator 12 calculates the similarity (first similarity) between the operation verification situation data received at Step S22 and the situation data 103-$k$ included in the data set 101-$k$ (1≤k≤n, n and k are integers equal to or greater than 1) stored in the storage device 13 (Step S23).

Then, the comparator 12 determines whether the similarity calculated at Step S23 is equal to or greater than the threshold value (Step S24). When the similarity is equal to or greater than the threshold value (Step S24, Yes), the comparator 12 reads the response data 102 associated with the situation data 103 of which the similarity is equal to or greater than the threshold value from the storage device 13 (Step S25). When the similarity is not equal to or greater than the threshold value (Step S24, No), the process proceeds to Step S26.

Then, the comparator 12 determines whether all of the data sets 101-$k$ stored in the storage device 13 have been determined (Step S26). When all of the data sets 101-$k$ have not been determined (Step S26, No), the process returns to Step S23.

When all of the data sets 101-$k$ have been determined (Step S26, Yes), the response constructor 14 constructs the response content DB 202 including the operation verification response data received at Step S21 and the response data 102 read at Step S25 (Step S27).

Then, the receiver 22 receives speech data from the verifier (Step S28). Then, the response controller 23 performs the above-mentioned response control, using the speech understanding model 201, the response content DB 202, and the response format DB 203, to determine a response format (Step S29).

Then, the response generator 24 generates a response sentence from the response format determined by the response control at Step S29, using the response generation model 204 (Step S30). Then, the output controller 25 outputs the response sentence generated at Step S30 (Step S31).

Then, the response controller 23 determines whether a dialogue corresponding to the speech data has ended (Step S32). Whether the dialogue has ended may be determined by any method. For example, when the response format including the operation verification response data input at Step S21 is generated, the response controller 23 determines that the dialogue has ended. For example, when the response format including the response data 102 read at Step S25 is generated, the response controller 23 determines that the dialogue has ended.

When the dialogue has not ended (Step S32, No), the process returns to Step S28. When the dialogue has ended (Step S32, Yes), the process ends.

Next, verification examples in the first embodiment will be described with reference to FIGS. 8 and 9.

Verification Examples

In the example illustrated in FIGS. 8 and 9, a case in which the dialogue system 200 is a system that searches for a plurality of shops in a shopping center and a plurality of items sold in the shops will be described.

Figure 8:
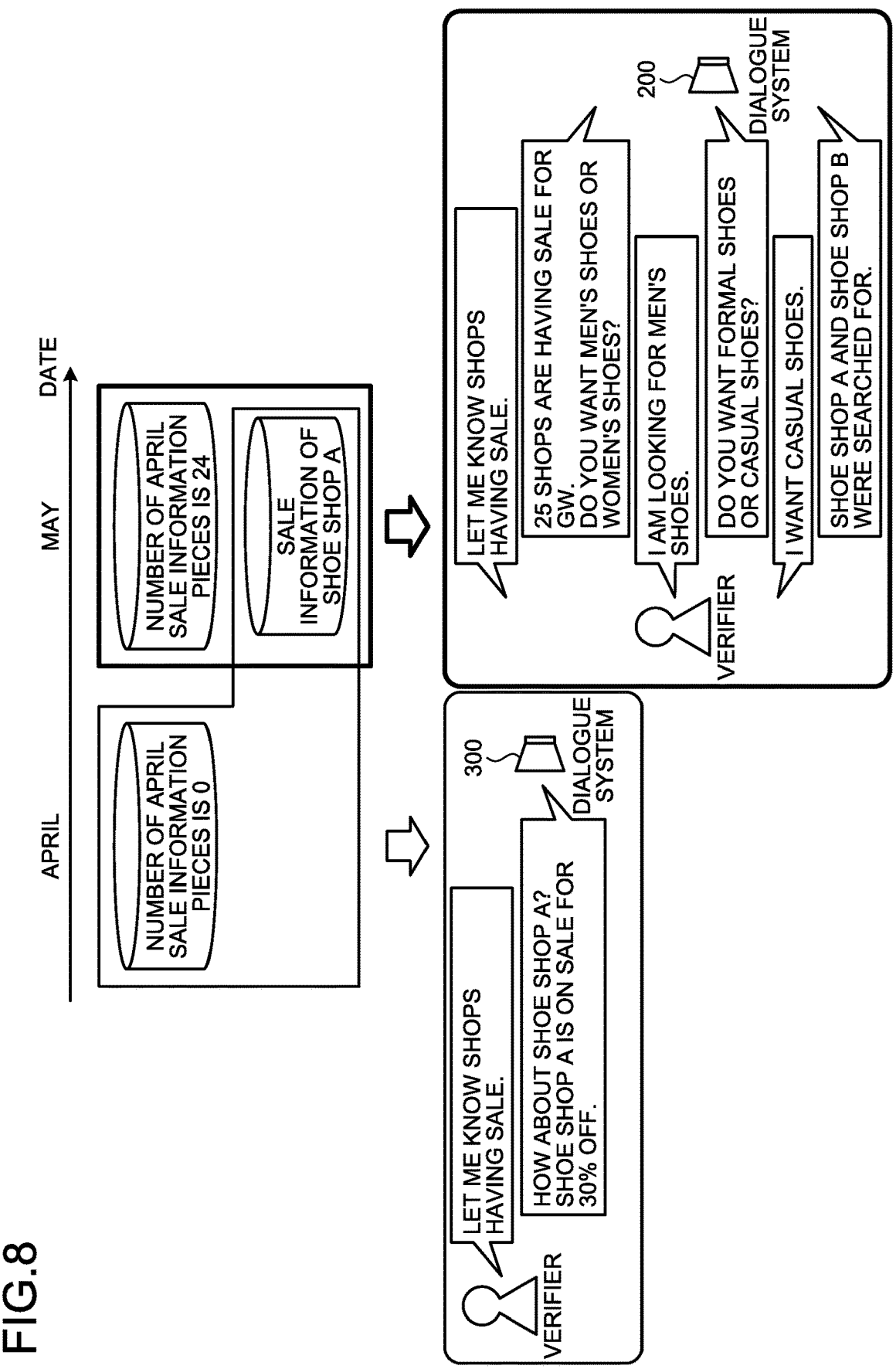
FIG. 8 is a diagram illustrating Verification Example 1 of the verification system according to the first embodiment.

FIG. 8 is a diagram illustrating Verification Example 1 of the verification system 100 according to the first embodiment. In the example illustrated in FIG. 8, the operator and the verifier are staff members of a shoe shop A in the shopping center. The operation verification response data indicates information about a May sale at the shoe shop A. The operation verification situation data indicates a target period of the May sale. A data set 101 includes 24 information pieces about a May sale at other shops as the response data 102 and includes 24 target periods of the May sale at other shops as the situation data 103.

In the dialogue system 200 according to the first embodiment, the response content DB 202 includes 24 information pieces about a May sale at other shops in addition to the information about the May sale at the shoe shop A. The dialogue system 200 of the first embodiment can achieve a dialogue about narrowing down a plurality of competing sale information pieces to the sale information of the shoe shop A, by using the response content DB 202.

Therefore, it is possible to easily verify the operation of the dialogue system 200 according to the situation in which the dialogue system 200 (dialogue engine) is actually used, as in a dialogue example illustrated on the right side of FIG. 8.

In contrast, in a dialogue system 300 according to the related art, the information of the shoe shop A is immediately presented only from "sale" information, as in a dialogue example illustrated on the left side of FIG. 8. However, in practice, for example, in many cases, other shops also have a sale during the Golden Week holiday period. The dialogue system 300 according to the related art needs to search for a plurality of sale information pieces and to narrow down the plurality of sale information pieces in order to obtain the information of the shoe shop A.

As such, the behavior of the dialogue system 300 according to the related art is largely different from that in the situation in which the dialogue system 300 is actually used. For this reason, it is difficult to verify the operation of the dialogue system 300 according to the situation in which the dialogue system 300 (dialogue engine) is actually used.

Figure 9:
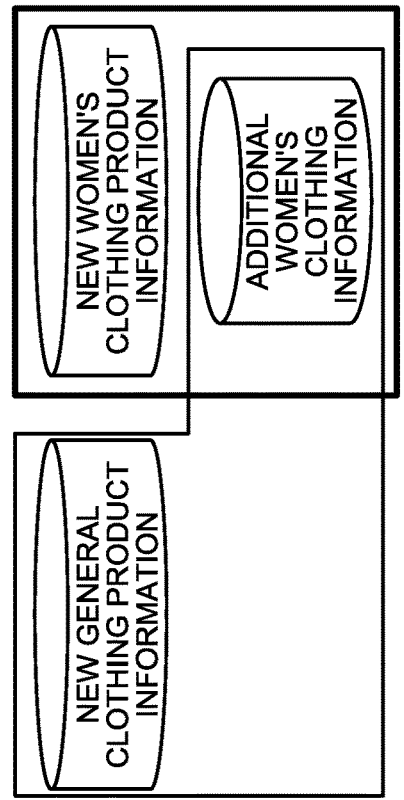
FIG. 9 is a diagram illustrating Verification Example 2 of the verification system according to the first embodiment.
Figure 9:
Figure 9:
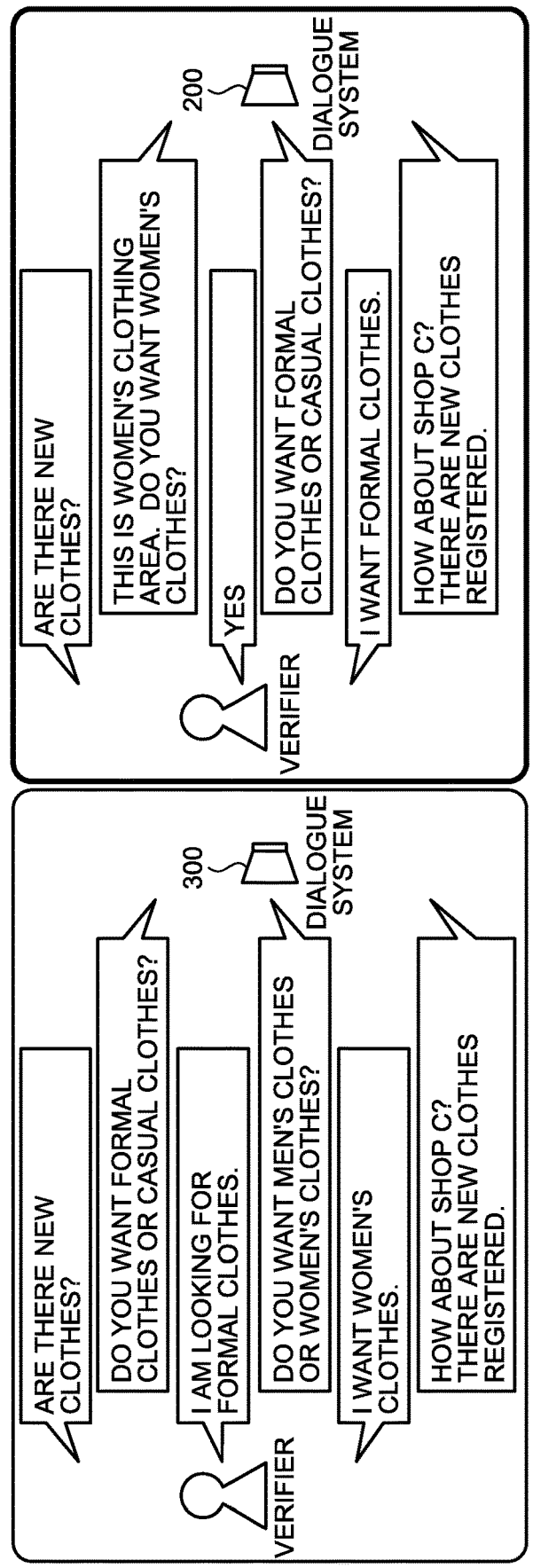

FIG. 9 is a diagram illustrating Verification Example 2 of the verification system 100 according to the first embodiment. In the example illustrated in FIG. 9, the operator and the verifier are staff members in a shop C in a women's clothing area of the shopping center. The operation verification response data indicates the additional women's clothing information of the shop C. The operation verification situation data indicates the position of the women's clothing area where the dialogue system 200 is installed. The data set 101 includes new general clothing product information and new women's clothing product information as the response data 102 and includes the position of a general clothing area and the position of the women's clothing area as the situation data 103.

In the dialogue system 200 according to the first embodiment, the response content DB 202 includes new women's clothing product information of shops that are in the same women's clothing area as the shop C, in addition to the additional women's clothing information. However, the new general clothing product information is not included in the response content DB 202 since it is the information of the shop in the general clothing area.

The dialogue system 200 according to the first embodiment can check an aspect in which advance information indicating that an inquiry about women's clothing is likely to be received in the women's clothing area is reflected during verification, by using the response content DB 202. Therefore, it is possible to easily verify the operation of the dialogue system 200 according to the situation in which the dialogue system 200 (dialogue engine) is actually used, as in a dialogue example illustrated on the right side of FIG. 9.

In contrast, in the dialogue system 300 according to the related art, it is difficult to verify the operation of the dialogue system 300, considering information about the place. Therefore, the dialogue system 300 promotes a dialogue according to the most basic scenario, as in a dialogue example illustrated on the left side of FIG. 9. In the dialogue system 300 according to the related art, it is difficult to check the aspect in which advance information indicating that an inquiry about women's clothing is likely to be received in the women's clothing area is reflected during verification. Therefore, it is difficult to verify the operation of the dialogue system 300 according to the situation in which the dialogue system 300 (dialogue engine) is actually used.

As described above, in the verification system 100 according to the first embodiment, the storage controller stores, in the storage device 13, the response data 102 (first response data) which is usable for generating one or more response sentences and the situation data 103 (first situation data) indicating the situation in which the response data 102 is used, in an associated manner with each other. The receiver 11 (first receiver) receives the operation verification response data (second response data) used to generate one or more response sentences. The comparator 12 determines the similarity (first similarity) between the situation data 103 and the operation verification situation data (second situation data) indicating the situation in which the operation verification response data is used. The response constructor 14 constructs the response content DB 202 (response content information) including the operation verification response data and the response data 102 associated with the situation data 103 of which the similarity is equal to or greater than the threshold value (first threshold value). The receiver 22 (second receiver) receives speech data indicating the user's speech. The response generator 24 generates a response sentence corresponding to the speech data, using the response content DB 202. Then, the output controller 25 outputs one or more response sentences.

Therefore, according to the verification system 100 of the first embodiment, it is possible to easily verify the operation of the dialogue engine according to the situation in which the dialogue engine (dialogue system 200) is used.

Modification Example 1 of First Embodiment

Next, Modification Example 1 of the first embodiment will be described. In Modification Example 1 of the first embodiment, the description of the same content as that in the first embodiment will not be repeated and components different from those in the first embodiment will be described.

In the first embodiment, the case in which the response constructor 14 constructs the response content DB 202 according to the situation in which the dialogue system 200 is used has been described. In Modification Example 1 of the first embodiment, the response constructor 14 constructs the response format DB 203 according to the situation in which the dialogue system 200 is used.

The storage device 13 stores the response format and situation data (third situation data) indicating a situation in which the response format is used in an associated manner with each other.

The comparator 12 determines similarity (second similarity) between the operation verification situation data (second situation data) and the third situation data.

The response constructor 14 constructs the response format DB 203 including one or more response formats associated with the third situation data of which the second similarity is equal to or greater than a second threshold value. The response constructor 14 stores the response format DB 203 in the storage device 21.

The response controller 23 determines a response format from the above-mentioned speech intention information, using the response format DB 203.

The response generator 24 generates a response sentence corresponding to speech data, using the response format determined by the response controller 23.

As described above, in Modification Example 1 of the first embodiment, the response format DB 203 corresponding to the situation in which the dialogue system 200 is used is constructed. Therefore, even when the same speech intention information is used, the response controller 23 can determine a response format that varies depending on the situation in which the dialogue system 200 is used.

According to Modification Example 1 of the first embodiment, similarly to the first embodiment, it is possible to easily verify the operation of the dialogue engine according to the situation in which the dialogue engine (dialogue system 200) is used.

Modification Example 2 of First Embodiment

Next, Modification Example 2 of the first embodiment will be described. In Modification Example 2 of the first embodiment, the description of the same content as that in the first embodiment will not be repeated and components different from those in the first embodiment will be described.

In the first embodiment, the case in which the response constructor 14 constructs the response content DB 202 according to the situation in which the dialogue system 200 is used has been described. In Modification Example 2 of the first embodiment, the response controller 23 determines a response format, using the speech understanding model 201 corresponding to the situation in which the dialogue system 200 is used.

The storage device 13 stores the speech understanding model 201 and situation data (fourth situation data) indicating the situation in which the speech understanding model 201 is used in an associated manner with each other.

The comparator 12 determines similarity (third similarity) between the operation verification situation data (second situation data) and the fourth situation data. The comparator 12 stores, in the storage device 21, the speech understanding model 201 associated with the fourth situation data of which the third similarity is equal to or greater than a threshold value (third threshold value).

The response controller 23 determines a response format based on speech intention information obtained from the speech understanding model 201 which has been stored in the storage device 21 by the comparator 12.

The response generator 24 generates a response sentence corresponding to speech data, using the response format determined by the response controller 23.

As described above, in Modification Example 2 of the first embodiment, the speech understanding model 201 corresponding to the situation in which the dialogue system 200 is used is used. Therefore, even when the same speech data is received, the response controller 23 can estimate the intention of the speech, based on the speech intention information that varies depending on the situation in which the dialogue system 200 is used.

According to Modification Example 2 of the first embodiment, similarly to the first embodiment, it is possible to easily verify the operation of the dialogue engine according to the situation in which the dialogue engine (dialogue system 200) is used.

Modification Example 3 of First Embodiment

Next, Modification Example 3 of the first embodiment will be described. In Modification Example 3 of the first embodiment, the description of the same content as that in the first embodiment will not be repeated and components different from those in the first embodiment will be described.

In the first embodiment, the case in which the response constructor 14 constructs the response content DB 202 according to the situation in which the dialogue system 200 is used has been described. In Modification Example 3 of the first embodiment, the response generator 24 generates a response sentence corresponding to speech data, using the response generation model 204 corresponding to the situation in which the dialogue system 200 is used.

The storage device 13 stores the response generation model 204 used to generate one or more response sentences and situation data (fifth situation data) indicating the situation in which the response generation model 204 is used, in an associated manner with each other.

The comparator 12 determines similarity (fourth similarity) between the operation verification situation data (second situation data) and the fifth situation data. The comparator 12 stores, in the storage device 21, the response generation model 204 associated with the fifth situation data of which the fourth similarity is equal to or greater than a threshold value (fourth threshold value).

The response generator 24 generates a response sentence corresponding to speech data, using the response generation model 204 which has been stored in the storage device 21 by the comparator 12.

As described above, in Modification Example 3 of the first embodiment, the response generation model 204 corresponding to the situation in which the dialogue system 200 is used is used. Therefore, even when the same response format is input from the response controller 23, the response generator 24 can generate a response sentence that varies depending on the situation in which the dialogue system 200 is used.

According to Modification Example 3 of the first embodiment, similarly to the first embodiment, it is possible to easily verify the operation of the dialogue engine according to the situation in which the dialogue engine (dialogue system 200) is used.

The first embodiment and Modification Examples 1 to 3 may be combined with each other. For example, when the operation verification situation data includes information indicating children (for example, information indicating children under the age of 10 and the position of a toy shop), the speech understanding model 201 including words (vocabularies) for children, the response content DB 202 including toy information, and the response generation model 204 generating a familiar response sentence may be used. In this case, it is possible to easily verify the operation of the dialogue engine according to the situation in which the dialogue engine (dialogue system 200) is used.

For example, when the operation verification situation data includes information indicating the place where a formal event is held, the response format DB 203 including a response format that proceeds with a dialogue by making responses step by step with careful confirmation and the response generation model 204 that generates a response sentence including refined diction may be used.

For example, when the operation verification situation data includes information indicating that a target is the wealthy, the speech understanding model 201 including words for the wealthy, the response content DB 202 including information about brand names, and the response generation model 204 that generates a formal response sentence may be used.

Second Embodiment

Next, a second embodiment will be described. In the second embodiment, the description of the same content as that in the first embodiment will not be repeated and components different from those in the first embodiment will be described.

Example of Functional Structure

Figure 10:
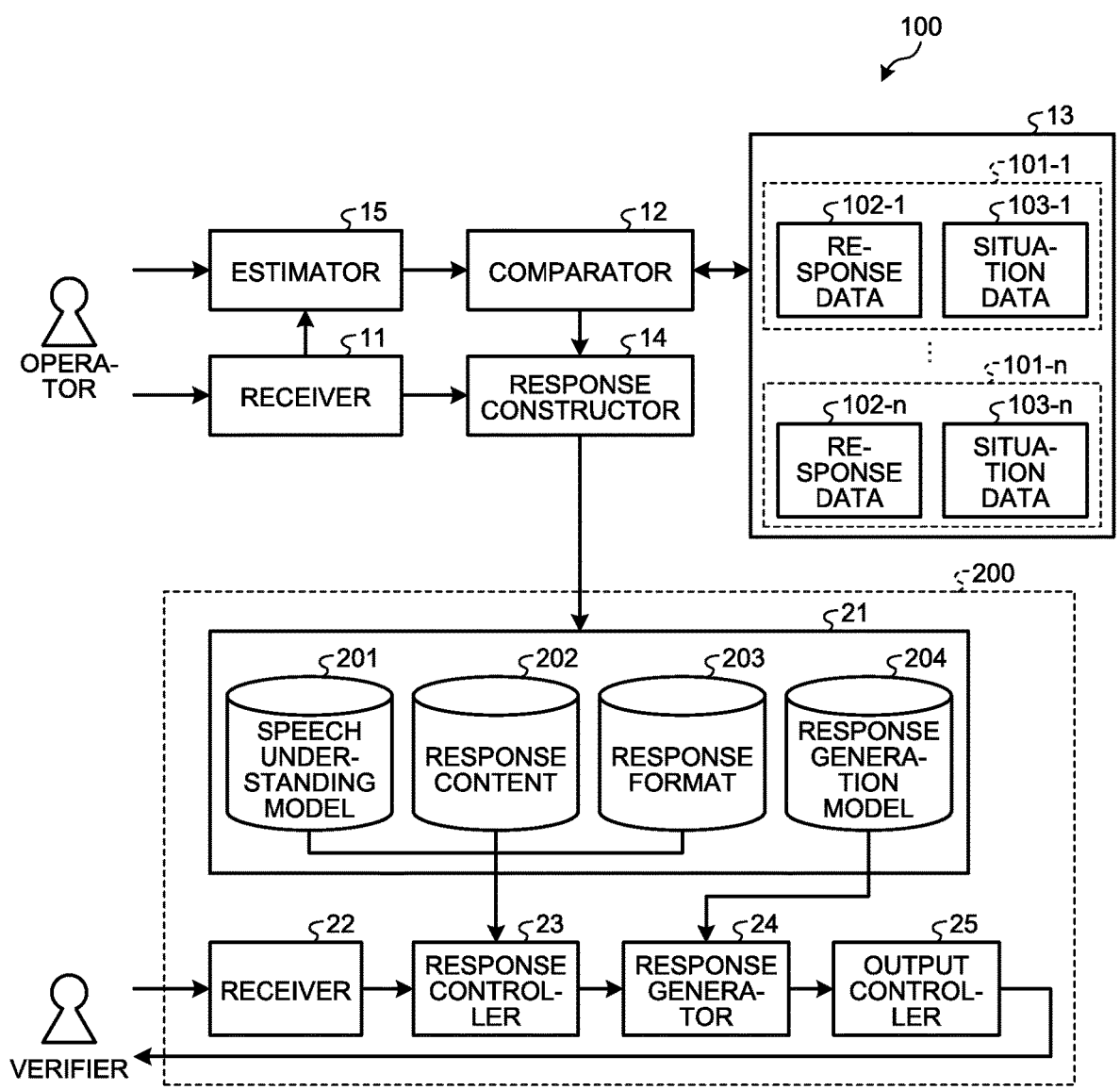
FIG. 10 is a diagram illustrating an example of the functional structure of a verification system according to a second embodiment.

FIG. 10 is a diagram illustrating an example of the functional structure of a verification system 100 according to the second embodiment. The verification system 100 according to the second embodiment includes a receiver 11, a comparator 12, a storage device 13, a response constructor 14, an estimator 15, and a dialogue system 200. The verification system 100 according to the second embodiment includes the estimator 15 in addition to the functional structure of the verification system 100 according to the first embodiment.

The estimator 15 estimates operation verification situation data (second situation data) from operation verification response data (second response data). The estimation may be performed by any method. For example, the estimator 15 may extract a portion of the operation verification response data as the operation verification situation data to perform the estimation. For example, the estimator 15 may estimate the operation verification situation data from the operation verification response data, using a rule and a statistical model.

Figure 11:
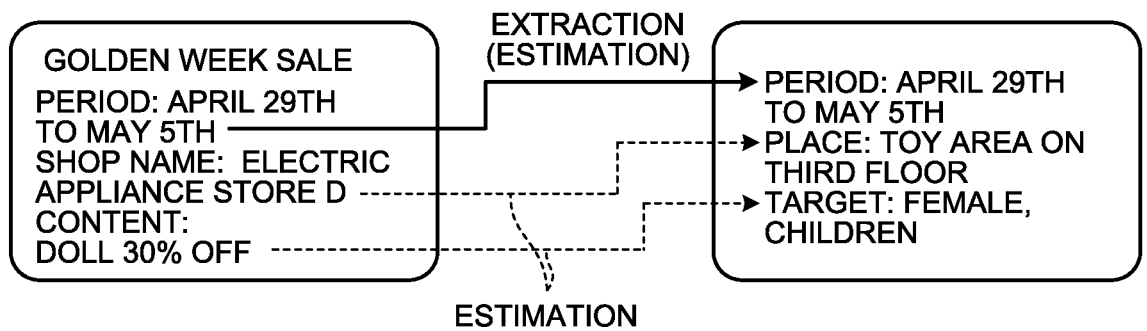
FIG. 11 is a diagram illustrating an estimation example of an estimator according to the second embodiment.

FIG. 11 is a diagram illustrating an estimation example of the estimator 15 according to the second embodiment. In the example illustrated in FIG. 11, the operation verification response data is Golden Week sale information. The Golden week sale information includes indicating a period (April 29th to May 5th), information indicating a shop name (electric appliance store D), and information indicating content (DOLL 30% OFF).

The information indicating a period is included in both the operation verification response data and the operation verification situation data. For example, the estimator 15 extracts the information indicating a period from the operation verification response data to estimate the information (April 29th to May 5th) indicating a period in the operation verification situation data.

For example, the estimator 15 estimates information (a toy area on the third floor) indicating a place in the operation verification situation data from the information indicating a shop name and the information indicating content, using the rule that a toy shop of an electric appliance store D is in the East area on the third floor.

For example, the estimator 15 estimates information (female and children) indicating a target in the operation verification situation data from the information indicating content, using the rule that the main target of dolls is girls.

As described above, in the verification system 100 according to the second embodiment, even when the receiver 11 does not receive the operation verification situation data from the operator, the estimator 15 can estimate the operation verification situation data. Therefore, according to the verification system 100 of the second embodiment, similarly to the verification system 100 according to the first embodiment, it is possible to easily verify the operation of the dialogue engine according to the situation in which the dialogue engine (dialogue system 200) is used.

Third Embodiment

Next, a third embodiment will be described. In the third embodiment, the description of the same content as that in the first embodiment will not be repeated and components different from those in the first embodiment will be described.

In the third embodiment, a case in which a response content DB 202 constructed by a response constructor 14 is corrected will be described.

Example of Functional Structure

Figure 12:
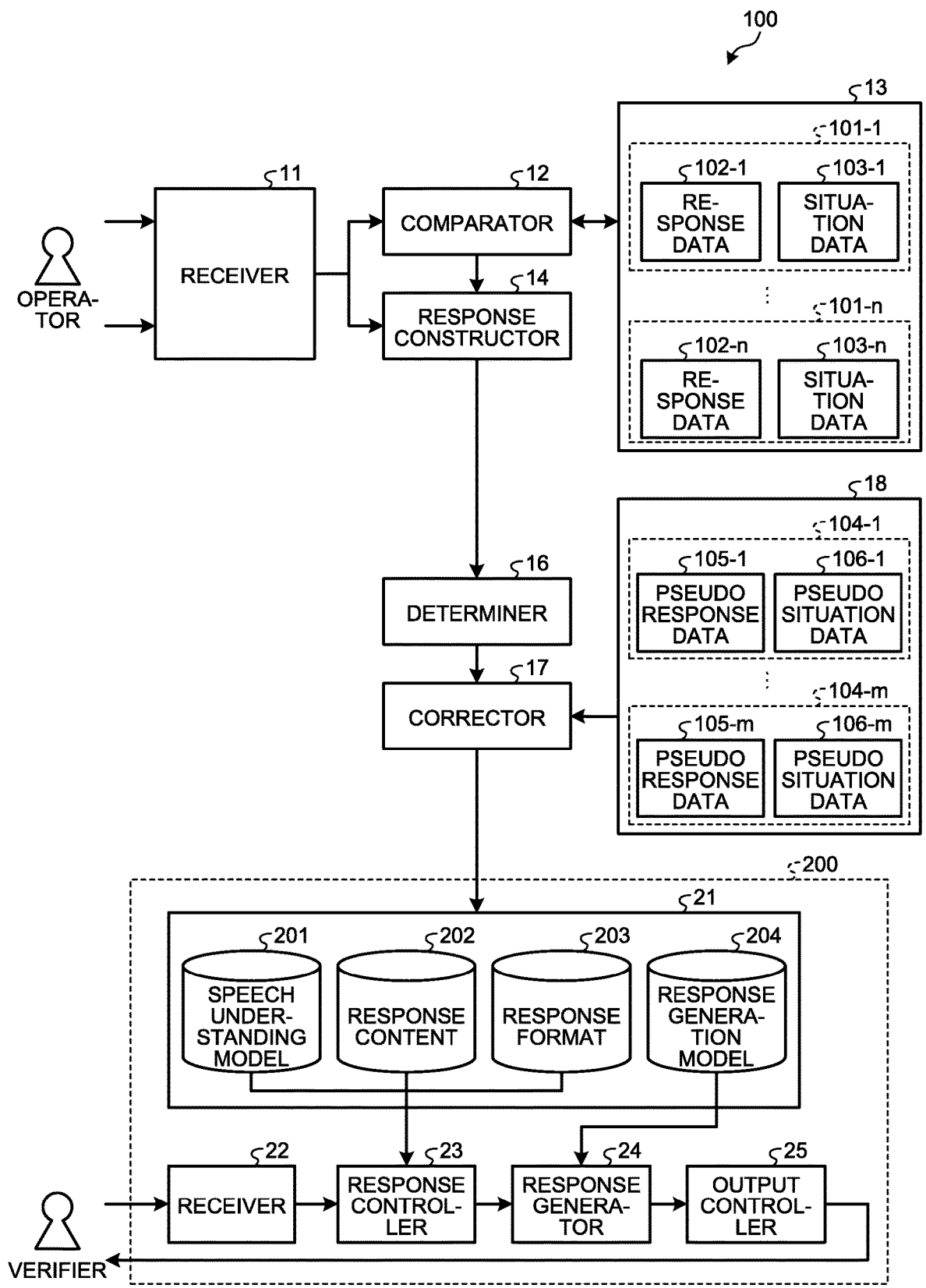
FIG. 12 is a diagram illustrating an example of the functional structure of a verification system according to a third embodiment.

FIG. 12 is a diagram illustrating an example of the functional structure of a verification system 100 according to the third embodiment. The verification system 100 according to the third embodiment includes a receiver 11, a comparator 12, a storage device 13, the response constructor 14, a determiner 16, a corrector 17, a storage device 18, and a dialogue system 200. The verification system 100 according to the third embodiment includes the determiner 16, the corrector 17, and the storage device 18 in addition to the functional structure of the verification system 100 according to the first embodiment.

The determiner 16 determines whether the response content DB 202 is appropriate. For example, when the number of data pieces included in the response content DB 202 is equal to or greater than a threshold value (fifth threshold value), the determiner 16 determines that the response content DB 202 is appropriate.

The storage device 18 (storage controller) stores pseudo data sets 104-1 to 104-$m$ ($m$ is an integer equal to or greater than 1).

The pseudo data set 104-1 includes pseudo response data 105-1 and pseudo situation data 106-1. Since the pseudo data sets 104-1 to 104-$m$ have the same structure, the pseudo data set 104-1 will be described as a representative example.

The pseudo response data 105-1 indicates pseudo response data. For example, the pseudo response data 105-1 is a duplicate of the response data 102 used in the past. Alternatively, for example, the pseudo response data 105-1 is fictitious response data.

The pseudo situation data 106-1 indicates a situation in which the pseudo response data 105-1 is used. For example, the pseudo situation data 106-1 includes at least one of information indicating a period, information indicating a place, information indicating age, information indicating sex, information indicating a price, information indicating a type, and information indicating taste. The pseudo situation data 106-1 may have any data format. The pseudo situation data 106-1 is, for example, parameters indicating the situation in which the pseudo response data 105-1 is used.

Hereinafter, when the pseudo data sets 104-1 to 104-$m$ are not distinguished from each other, they are simply referred to as pseudo data sets 104. Similarly, when the pseudo response data pieces 105-1 to 105-$m$ are not distinguished from each other, they are simply referred to as pseudo response data 105. When the pseudo situation data pieces 106-1 to 106-$m$ are not distinguished from each other, they are simply referred to as pseudo situation data 106.

When the number of data pieces included in the response content DB 202 is equal to or less than the fifth threshold value, the corrector 17 determines similarity (fifth similarity) between the operation verification situation data (second situation data) and the pseudo situation data 106. The corrector 17 adds the pseudo response data 105 associated with the pseudo situation data 106 of which the fifth similarity is equal to or greater than the threshold value (fifth threshold value) to the response content DB 202 to correct the response content DB 202. The corrector 17 stores the corrected response content DB 202 in the storage device 21.

The storage devices 13 and 18 may be implemented as one storage device. Similarly, the comparators 12 and 16 may be implemented as one comparator.

Next, a verification method according to the third embodiment will be described.

Verification Method

Figure 13:
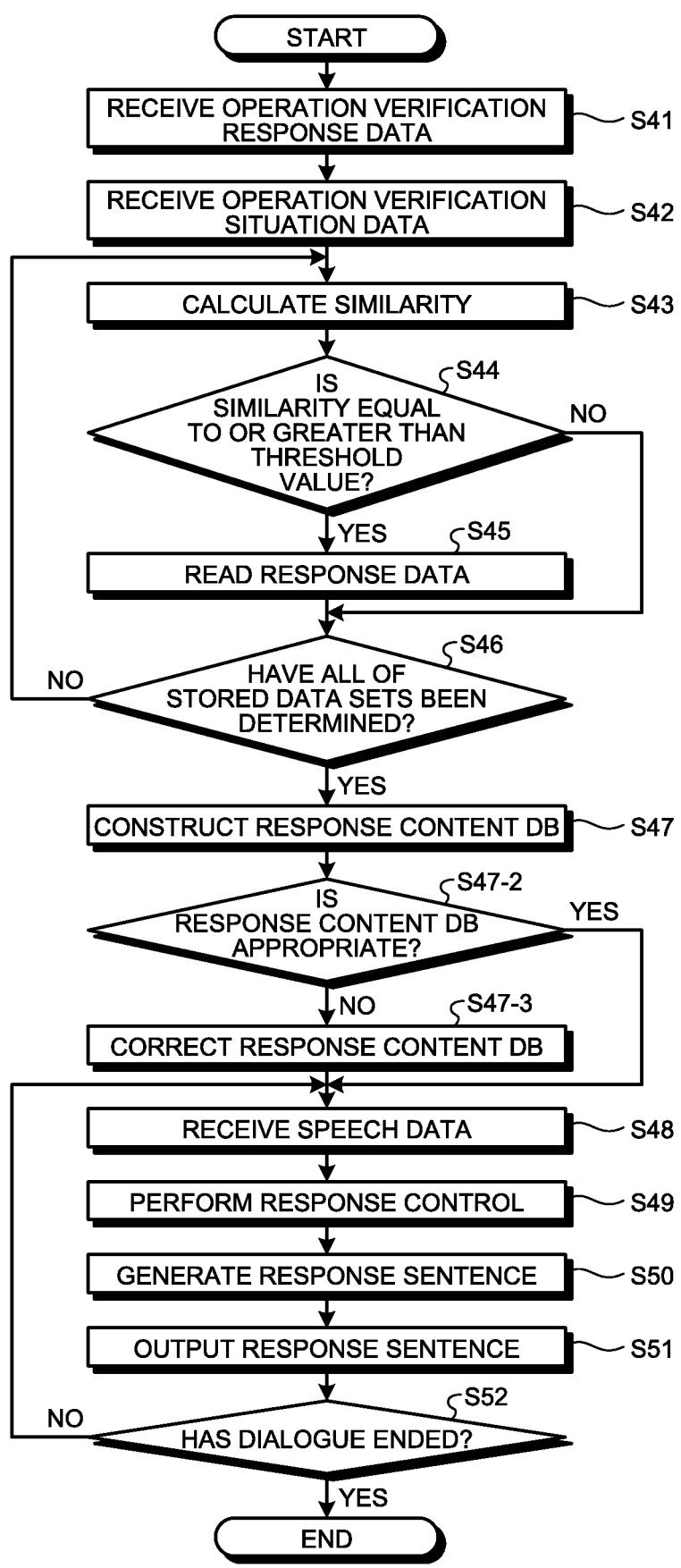
FIG. 13 is a flowchart illustrating an example of a verification method according to the third embodiment.

FIG. 13 is a flowchart illustrating an example of the verification method according to the third embodiment. Since Steps S41 to S47 are the same as Steps S21 to S27 (see FIG. 7) in the verification method according to the first embodiment, respectively, the description thereof will not be repeated.

The determiner 16 determines whether the response content DB 202 is appropriate (Step S47-2). For example, the determiner 16 determines whether the number of data pieces included in the response content DB 202 is equal to or greater than the threshold value (fifth threshold value).

When the response content DB 202 is not appropriate (Step S47-2, No), the corrector 17 corrects the response content DB 202 (Step S47-3). Specifically, the corrector 17 determines the similarity (fifth similarity) between the operation verification situation data (second situation data) and the pseudo situation data 106. Then, the corrector 17 adds the pseudo response data 105 associated with the pseudo situation data 106 of which the fifth similarity is equal to or greater than the threshold value (fifth threshold value) to the response content DB 202 to correct the response content DB 202.

When the response content DB 202 is appropriate (Step S47-2, Yes), the process proceeds to Step S48.

Since Steps S48 to S52 are the same as Steps S28 to S32 (see FIG. 7) in the verification method according to the first embodiment, the description thereof will not be repeated.

According to the verification system 100 of the third embodiment, even when the number of data sets 101 stored in the storage device 13 is not sufficient, it is possible to verify the operation of the dialogue system 200 according to the situation in which the dialogue system 200 (dialogue engine) is actually used.

For example, in Verification Example 1 illustrated in FIG. 8, when the number of information pieces about the May sale is not sufficient, the dialogue ends after one interaction, as in the dialogue example illustrated on the left side of FIG. 8. However, in the third embodiment, the use of the pseudo data set 104 makes it possible to achieve a dialogue that narrows down a plurality of competing sale information pieces to the sale information of the shoe shop A, as the dialogue system 200 is actually used.

Finally, an example of the hardware configuration of the verification system 100 according to the first to third embodiments will be described.

Example of Hardware Configuration

Figure 14:
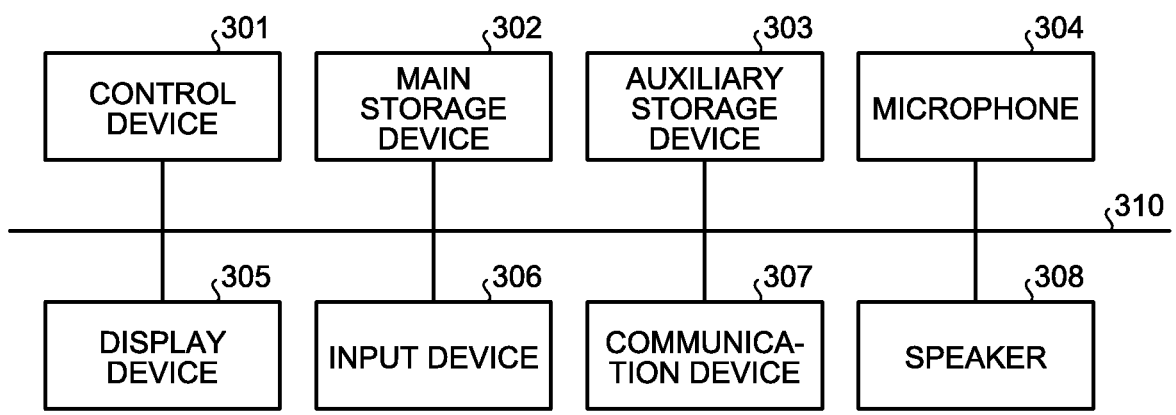
FIG. 14 is a diagram illustrating an example of the hardware configuration of the verification system according to the first to third embodiments.

FIG. 14 is a diagram illustrating an example of the hardware configuration of the verification system 100 according to the first to third embodiments. The verification system 100 according to the first to third embodiments includes a control device 301, a main storage device 302, an auxiliary storage device 303, a microphone 304, a display device 305, an input device 306, a communication device 307, and a speaker 308. The control device 301, the main storage device 302, the auxiliary storage device 303, the microphone 304, the display device 305, the input device 306, the communication device 307, and the speaker 308 are connected to each other by a bus 310.

The control device 301 executes a program that has been read from the auxiliary storage device 303 to the main storage device 302. The control device 301 is, for example, one or more processors such as CPUs. The main storage device 302 is a memory such as a read only memory (ROM) or a random access memory (RAM). The auxiliary storage device 303 is, for example, a memory card or a hard disk drive (HDD).

The microphone 304 receives a voice. The microphone 304 receives, for example, a voice indicating speech data.

The display device 305 displays information. The display device 305 is, for example, a liquid crystal display. The input device 306 receives information. The input device 306 is, for example, a keyboard or a mouse. The display device 305 and the input device 306 may be a liquid crystal touch panel having both a display function and an input function.

The communication device 307 communicates with other devices. The speaker 308 outputs a voice. The speaker 308 outputs, for example, a voice indicating a response sentence.

The program executed by the verification system 100 according to the first to third embodiments is stored in a computer readable storage medium, such as a CD-ROM, a memory card, a CD-R disc, or a digital versatile disc (DVD), as a file with an installable or executable format and is provided as a computer program product.

In addition, the program executed by the verification system 100 according to the first to third embodiments may be stored in a computer that is connected to a network, such as the Internet, may be downloaded through the network, and may be provided. Furthermore, the program executed by the verification system 100 according to the first to third embodiments may be provided through the network, such as the Internet, without being downloaded.

In addition, the program executed by the verification system 100 according to the first to third embodiments may be incorporated into, for example, a ROM in advance and then provided.

The program executed by the verification system 100 according to the first to third embodiments is configured as modules having the functions that can be implemented by the program in the functional structure of the verification system 100 according to the first to third embodiments.

The control device 301 reads the program from a storage medium, such as the auxiliary storage device 303, and executes the program to load the functions implemented by the program to the main storage device 302. That is, the functions implemented by the program are generated in the main storage device 302.

Some of the functions of the verification system 100 according to the first to third embodiments may be implemented by hardware such as an integrated circuit (IC). The IC is, for example, a processor that performs a dedicated process.

In addition, when a plurality of processors are used to implement each function, each processor may implement one of the functions or two or more of the functions.

Furthermore, the operation mode of the verification system 100 according to the first to third embodiments may be arbitrary. For example, the verification system 100 according to the first to third embodiments may be operated as a cloud system in the network.

In addition, the verification system 100 according to the first to third embodiments may be implemented by one computer or a plurality of computers.

In the verification system 100 according to the first embodiment, the case in which the response constructor 14 constructs the response content DB 202, using the response data 102 read based on the similarity between the operation verification situation data and the situation data 103 has been described. However, the response constructor 14 may construct the response content DB 202, using all of the response data 102 stored in the storage device 13. Then, the response controller 23 may determine data to be selected from the response content DB 202, with reference to the operation verification situation data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A verification system comprising:
a storage controller comprising one or more hardware processors and configured to store, in a storage device, first response data and first situation data associated with the first response data, the first response data used to generate one or more response sentences, the first situation data indicating a first context for using the first response data;
a first receiver configured to receive second response data used to generate the one or more response sentences;
a comparator comprising one or more hardware processors and configured to determine a first similarity between second situation data indicating a second context for using the second response data and the first situation data;
a response constructor comprising one or more hardware processors and configured to construct response content information comprising the second response data and the first response data associated with the first situation data when the first similarity is equal to or greater than a first threshold value;
a second receiver configured to receive speech data corresponding to a user's speech;
a response generator comprising one or more hardware processors and configured to generate a response sentence corresponding to the speech data using the response content information, wherein the storage controller is further configured to store, in the storage device, pseudo response data for generating the one or more response sentences and pseudo situation data indicating a third context in which the pseudo response data is associated with the pseudo situation data;

a corrector comprising one or more hardware processors and configured to, when the number of data pieces included in the response content information is equal to or less than a second threshold value, determine a second similarity between the second situation data and the pseudo situation data, and add the pseudo response data associated with the pseudo situation data when the second similarity is equal to or greater than the second threshold value to the response content information to correct the response content information; and an output controller comprising one or more hardware processors and configured to output for display the one or more response sentences.

2. The system according to claim 1, wherein
the first receiver is further configured to receive the second situation data.

3. The system according to claim 1, further comprising an estimator comprising one or more hardware processors and configured to estimate the second situation data based at least in part on the second response data.

4. The system according to claim 1, wherein
the first situation data and the second situation data include at least one of information indicating a period, information indicating a place, information indicating age, information indicating sex, information indicating a price, information indicating a type, and information indicating taste.

5. The system according to claim 1, further comprising a response controller comprising one or more hardware processors and configured to determine a response format of a response sentence corresponding to speech intention information which indicates an intention of the speech data, wherein
the storage controller is further configured to store, in the storage device, the response format and third situation data indicating a fourth context in which the response format is associated with the third situation data,
the comparator further configured to determine a third similarity between the second situation data and the third situation data,
the response constructor further configured to construct response format information including one or more response formats associated with the third situation data when the third similarity is equal to or greater than a third threshold value,
the response controller further configured to determine the response format from the speech intention information using the response format information, and
the response generator is further configured to generate the response sentence corresponding to the speech data using the response format determined by the response controller.

6. The system according to claim 5, wherein
the response format includes at least one of a question format, a confirmation format, or a proposal format.

7. The system according to claim 1, further comprising a response controller comprising one or more hardware processors and configured to determine a response format of a response sentence corresponding to speech intention information which indicates an intention of the speech data, wherein
the storage controller is further configured to store, in the storage device, speech understanding information in which a feature amount indicating a feature of a word and the speech intention information are associated with each other and fourth situation data indicating a situation when the speech understanding information is used with the fourth situation data,
the comparator further configured to determine a fourth similarity between the second situation data and the fourth situation data, and
the response controller further configured to determine the response format based on the speech intention information which is obtained from the speech understanding information associated with the fourth situation data when the fourth similarity is equal to or greater than a fourth threshold value.

8. The system according to claim 1, wherein
the storage controller is further configured to store, in the storage device, response generation information used to generate the one or more response sentences and fifth situation data indicating a fifth context in which the response generation information is associated with the fifth situation data,
the comparator further configured to determine a fifth similarity between the second situation data and the fifth situation data, and
the response generator is further configured to generate the response sentence corresponding to the speech data using the response generation information associated with the fifth situation data when the fifth similarity is equal to or greater than a fifth threshold value.

9. A verification method comprising:
storing, in a storage device, first response data and first situation data associated with the first response data, the first response data used to generate one or more response sentences, the first situation data indicating a first context for using the first response data;
receiving second response data used to generate the one or more response sentences;
determining a first similarity between second situation data indicating a second context for using the second response data and the first situation data;
constructing response content information comprising the second response data and the first response data associated with the first situation data when the first similarity is equal to or greater than a first threshold value;
receiving speech data corresponding to a user's speech;
generating a response sentence corresponding to the speech data using the response content information;
storing, in the storage device, pseudo response data for generating the one or more response sentences and pseudo situation data indicating a third context in which the pseudo response data is associated with the pseudo situation data;
determining, when the number of data pieces included in the response content information is equal to or less than a second threshold value, a second similarity between the second situation data and the pseudo situation data, and adding the pseudo response data associated with the pseudo situation data when the second similarity is equal to or greater than the second threshold value to the response content information to correct the response content information; and
outputting the one or more response sentences.

10. A computer program product comprising a non-transitory computer-readable medium containing programmed instructions that cause a computer to function as:
a storage controller configured to store, in a storage device, first response data and first situation data associated with the first response data, the first response data used to generate one or more response sentences, the first situation data indicating a first context for using the first response data;

a first receiver configured to receive second response data used to generate the one or more response sentences;

a comparator configured to determine a first similarity between second situation data indicating a second context for using the second response data and the first situation data;

a response constructor configured to construct response content information comprising the second response data and the first response data associated with the first situation data when the first similarity is equal to or greater than a first threshold value;

a second receiver unit configured to receive speech data corresponding to a user's speech;

a response generator configured to generate a response sentence corresponding to the speech data using the response content information, wherein the storage controller is further configured to store, in the storage device, pseudo response data for generating the one or more response sentences and pseudo situation data indicating a third context in which the pseudo response data is associated with the pseudo situation data;

a corrector comprising one or more hardware processors and configured to, when the number of data pieces included in the response content information is equal to or less than a second threshold value, determine a second similarity between the second situation data and the pseudo situation data, and add the pseudo response data associated with the pseudo situation data when the second similarity is equal to or greater than the second threshold value to the response content information to correct the response content information; and an output controller configured to output for display the one or more response sentences.

* * * * *